United States Patent [19]

Hake

[11] Patent Number: 5,385,213

[45] Date of Patent: Jan. 31, 1995

[54] STEERING ASSEMBLY FOR MACHINE WITH WORKING IMPLEMENT

[76] Inventor: Leon Hake, Rte. 2, Box 176, Perry, Okla. 73077

[21] Appl. No.: 102,876

[22] Filed: Aug. 6, 1993

[51] Int. Cl.$^6$ ............................................. B62D 3/02
[52] U.S. Cl. .................................. 180/210; 180/79.3; 280/771
[58] Field of Search ............... 180/24, 209, 210, 79.3; 280/771, 774, 93, 98

[56] References Cited

U.S. PATENT DOCUMENTS

| | | | |
|---|---|---|---|
| 1,024,505 | 4/1912 | Gilstrap | 180/79.3 |
| 2,976,942 | 3/1961 | Pitcher | 408/77 |
| 3,085,644 | 4/1963 | Van der Lely | 180/210 |
| 3,895,843 | 7/1975 | Wall et al. | 180/210 |

Primary Examiner—Kenneth R. Rice
Assistant Examiner—Victor E. Johnson
Attorney, Agent, or Firm—Dunlap, Codding & Lee

[57] ABSTRACT

A machine including a frame with a working implement assembly connected thereto and a steering assembly for steeringly guiding the frame. The frame is movably supported on a first, second and third wheel. The steering assembly is connected to the first and the second wheels for steeringly turning the first and the second wheels simultaneously in opposite directions for steeringly causing the machine to be turned.

12 Claims, 6 Drawing Sheets

STEERING ASSEMBLY FOR MACHINE WITH WORKING IMPLEMENT

FIELD OF THE INVENTION

The present invention relates generally to machines with working implement assemblies connected thereto and, more particularly, but not by way of limitation, to a steering assembly for such machines for steeringly turning the machine where the machine is rollingly supported on first, second and third wheel assemblies and wherein the steering assembly steeringly turns the first and the second wheel means for steeringly turning the machine.

BRIEF DESCRIPTION OF THE DRAWINGS

FIG. 6 is an enlarged view showing the second wheel assembly and the connection of the second wheel assembly to the steering plate and showing the second wheel assembly in one other turning position.

FIG. 9 is a diagrammatic view showing a portion of the steering assembly.

DESCRIPTION OF THE PREFERRED EMBODIMENTS

Figure 1:
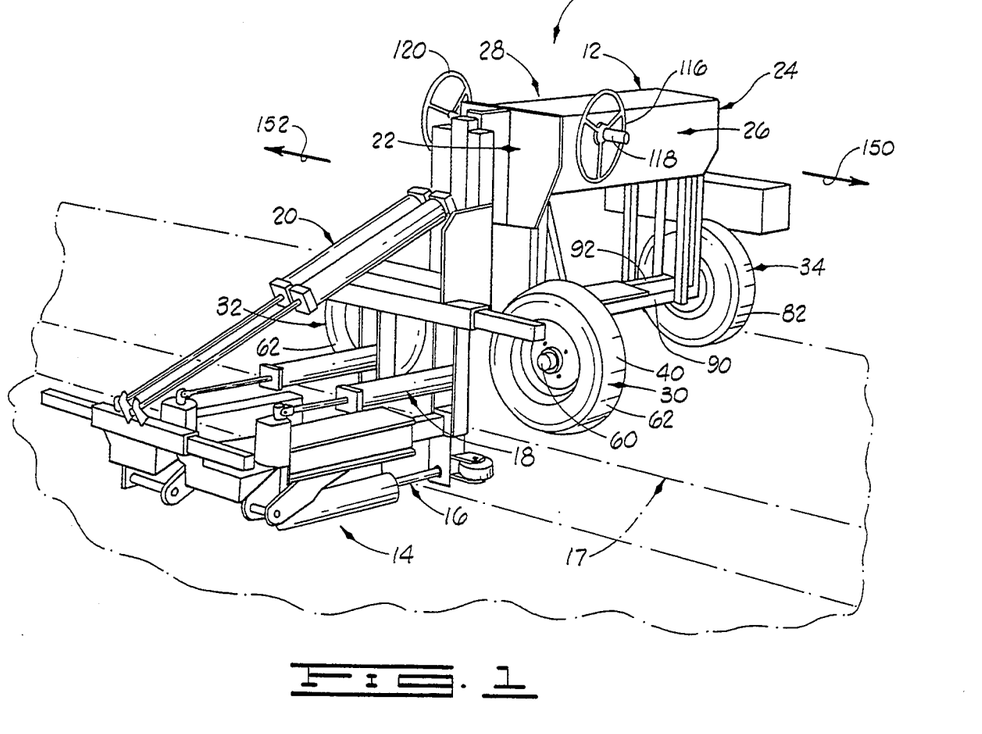
FIG. 1 is a perspective view showing a machine constructed in accordance with the present invention having a working implement assembly connected to the machine.
Figure 2:
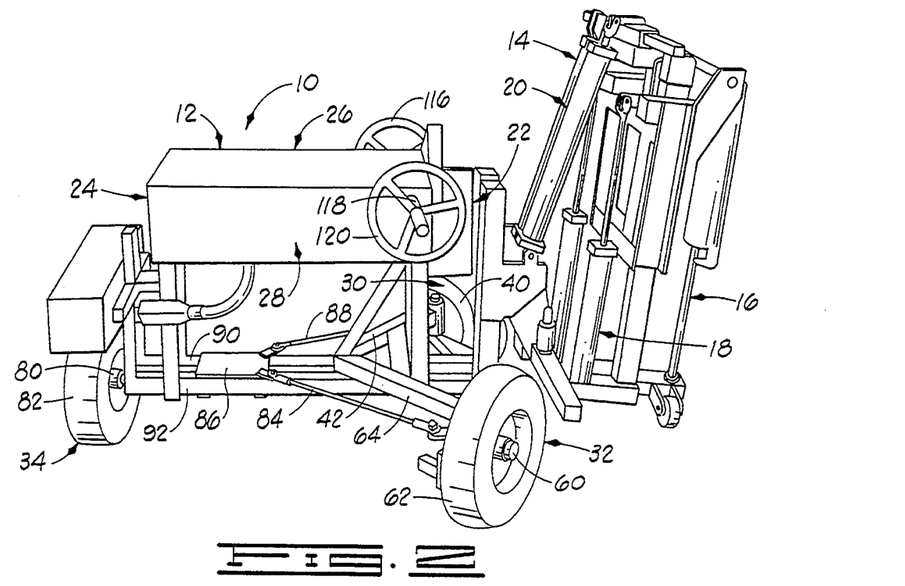
FIG. 2 is a perspective view showing the opposite side of the machine as compared to FIG. 1 partial perspective view showing the working implement assembly in the upright position and showing the wheel assemblies in one turning position.
Figure 3:
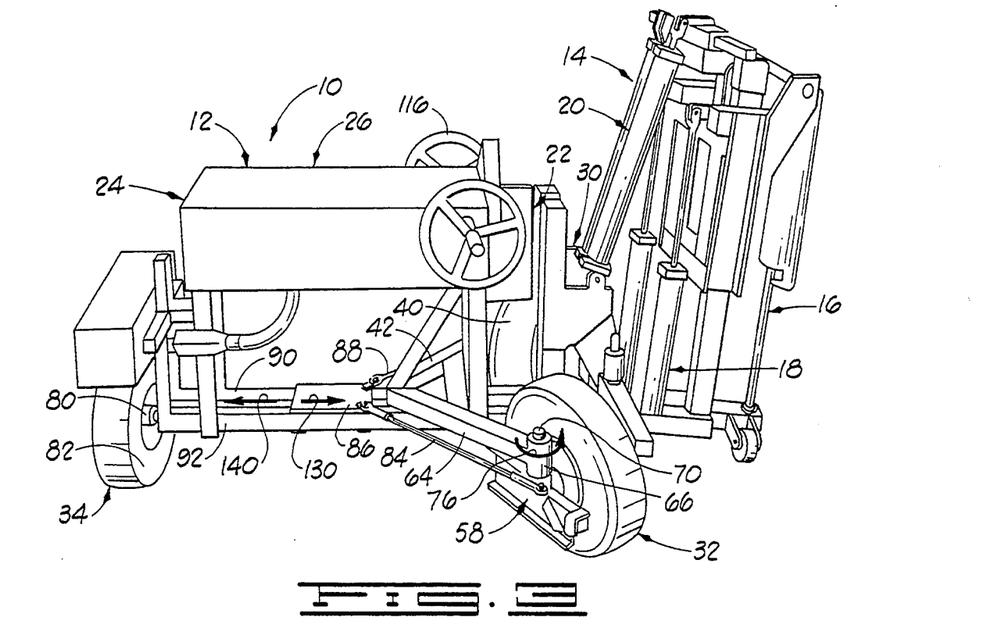
FIG. 3 is a perspective view, similar to FIG. 2, but showing the wheel assemblies in one other turning position.

Shown in FIGS. 1, 2 and 3 and designated by the general reference numeral 10 is a machine constructed in accordance with the present invention. The machine comprises a frame 12 with a working implement assembly 14 connected thereto.

As diagrammatically illustrated in FIGS. 1, 2 and 3, the working implement assembly 14 more particularly comprises a plurality of drills 16 (two drills 16 being shown in FIGS. 1, 2 and 3). The drills 16 are adapted and supported on the frame 12 for drilling holes in the side edge of concrete (shown in dashed lines in FIG. 1 and designated by the reference numeral 17). The drills 16 are movably supported by way of a pair of hydraulic cylinders 18 which are connected to the drills 16 for moving the drills 16 into engagement with the concrete 17 and for withdrawing the drills 16 from engagement with the concrete 17.

The working implement assembly 14 is movably supported on the frame 12 and a pair of hydraulic cylinders 20 (FIGS. 1, 2 and 3) are connected to the frame 12 and the working implement assembly 14. The hydraulic cylinders 20 are adapted to move the working implement assembly 14 to an upright storage position (FIGS. 2 and 3) and to move the working implement assembly 14 to a working position (FIG. 1).

Machines or gang drills of the type generally described before with respect to the machine 10 are commercially available from such sources as E-Z Drill, Inc., Stillwater, Okla., and such machines are well known in the art and a detailed description of the construction and the operation of such machines is not deemed necessary herein.

The frame 12 has a front end 22, a rear end 24, a first side 26 and a second side 28. The working implement assembly 14 more particularly is movably connected to the front end 22 of the frame 12.

Figure 7:
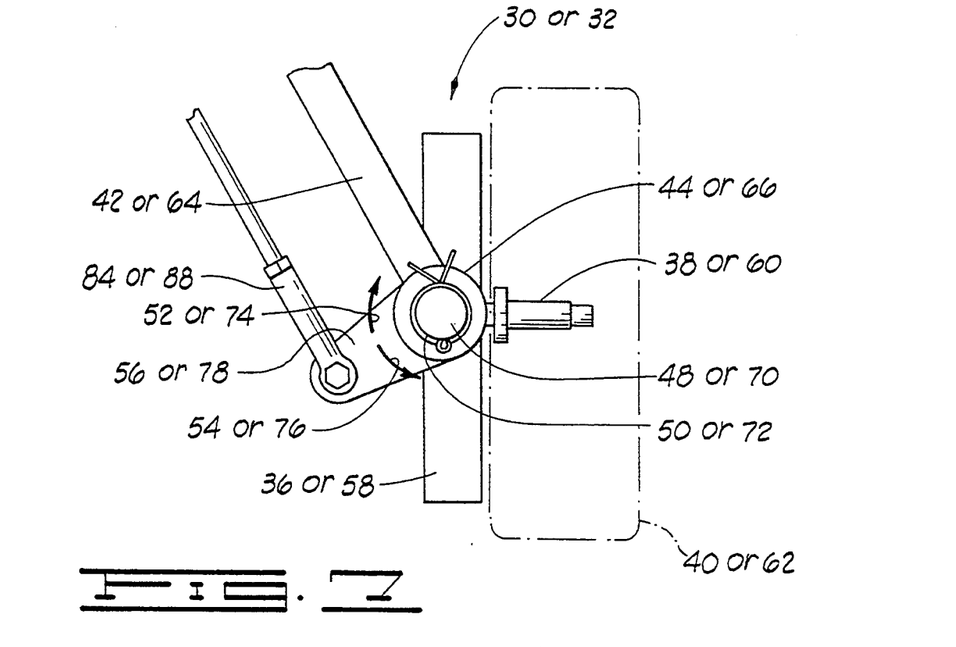
FIG. 7 is a top view showing a portion of a typical first or second wheel assembly and a fragmentary portion of the frame.
Figure 8:
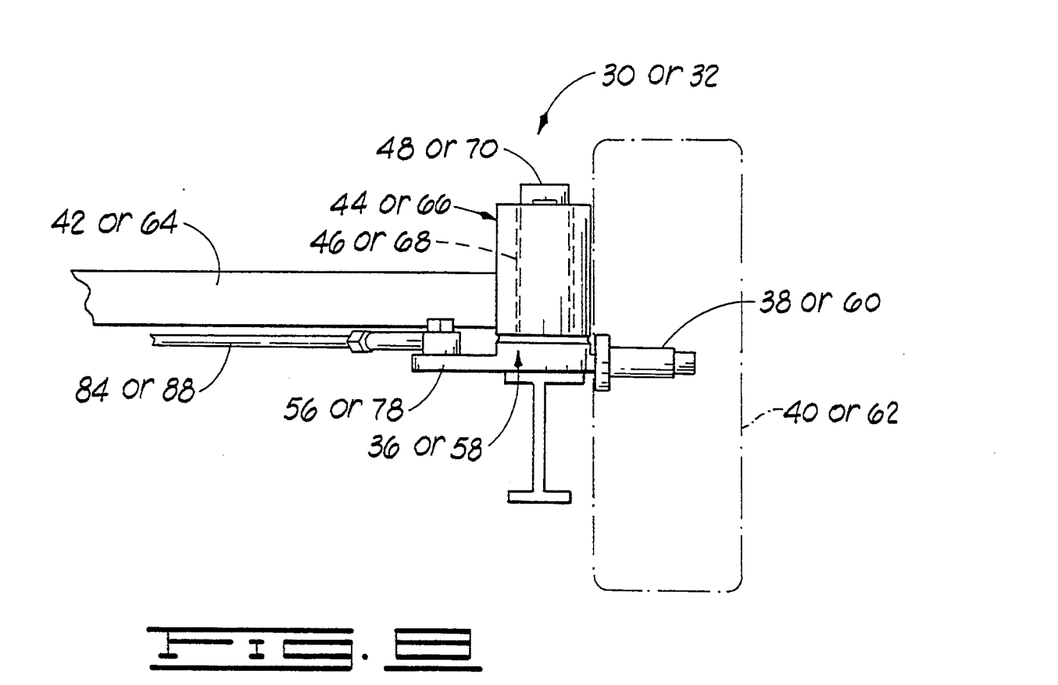
FIG. 8 is a front elevational view of a typical first or second wheel assembly and showing a fragmentary portion of the frame.

The frame 12 is rollingly and movably supported on a first wheel assembly 30 (FIGS. 1, 2, 3, 7 and 8), a second wheel assembly 32 (FIGS. 1, 2, 3, 5, 6, 7 and 8) and a third wheel assembly 34 (FIGS. 1, 2 and 8). The first wheel assembly 30 is connected to the frame 12 and disposed generally near the first side 26 of the frame 12 and near the first end 22 of the frame 12. The second wheel assembly 32 is connected to the frame 12 and disposed near the second side 28 of the frame 12 and disposed near the front end 22 of the frame 12. The third wheel assembly 34 is disposed near the rear end 24 of the frame 12 and disposed generally between the first and the second wheel assemblies 30 and 32.

The first wheel assembly 30 comprises a wheel frame 36 (FIGS. 7 and 8), a first axle 38 (FIGS. 7 and 8) connected to the wheel frame 36 and extending a distance outwardly therefrom and a first wheel 40 (FIGS. 1, 2, 3, 7 and 8) rotatingly supported on the end of the first axle 38, opposite the end of the first axle 38 which is connected to the wheel frame 36.

The first wheel assembly 30 also includes a wheel arm 42 (FIGS. 2, 3, 5, 6, 7 and 8). One end of the wheel arm 42 is secured to the frame 12 and the wheel arm 42 extends a distance outwardly and angularly from the frame 12. A bushing 44 (FIGS. 7 and 8) is connected to the end of the wheel arm 42, opposite the end of the wheel arm 42 which is connected to the frame 12. The bushing 44 has an opening 46 (shown in dashed lines in FIG. 8) which extends therethrough. A spindle 48 which defines a first vertical axis (FIGS. 7 and 8) is disposed through the opening 46 in the bushing 44 and secured in one position therein by way of a pin 50 (FIG. 7). One end of the spindle 48 is secured to the wheel frame 36 so that the wheel frame 36 and the first wheel 40 connected thereto are rotatable about the spindle in a first direction 52 (FIG. 7) and an opposite second direction 54 (FIG. 7).

One end of a wheel flange 56 (FIGS. 7 and 8) is secured to the wheel frame 36. The wheel flange 56 extends a distance outwardly from the wheel frame 36.

The second wheel assembly 32 comprises a wheel frame 58 (FIGS. 3, 5, 7 and 8). A second axle 60 (FIGS. 1, 2, 5, 7 and 8) is connected to the wheel frame 58 and extends a distance outwardly therefrom. A second wheel 62 is rotatingly supported on the end of the second axle 60, opposite the end of the second axle 60 which is connected to the wheel frame 58.

Figure 5:
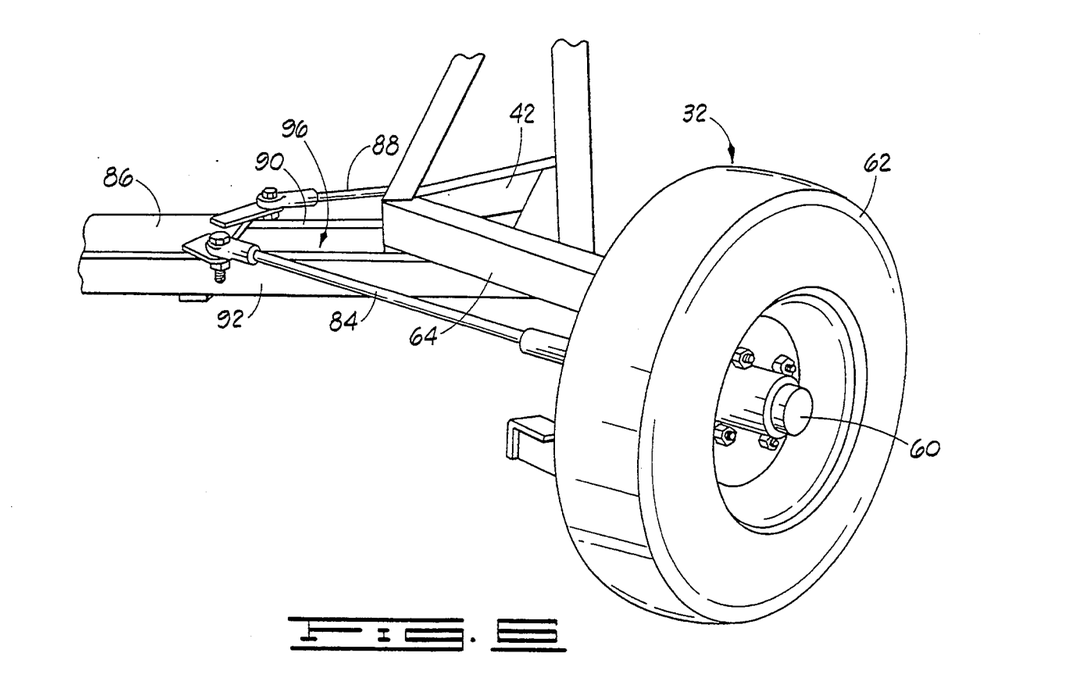
FIG. 5 is an enlarged view showing the second wheel assembly and the connection of the second wheel assembly to the steering plate and showing the second wheel assembly in one turning position.

The second wheel assembly 32 also includes a wheel arm 64 (FIGS. 2, 3, 5, 6, 7 and 8). One end of the wheel arm 64 is secured to the frame 12 and the wheel arm 64 extends a distance outwardly and angularly from the frame 12. A bushing 66 (FIGS. 3, 5, 6, 7 and 8) is connected to the end of the wheel arm 64, opposite the end of the wheel arm 64 which is connected to the frame 12. The bushing 66 has an opening 68 (shown in dashed lines in FIG. 8) which extends therethrough. A spindle 70 which defines a second vertical axis (FIGS. 3, 5, 7 and 8) is disposed through the opening 68 in the bushing 66 and secured in one position therein by way of a pin 72 (FIGS. 5 and 7). One end of the spindle 70 is secured to the wheel frame 58 so that the wheel frame 58 and the second wheel 62 connected thereto are rotatable about the spindle in a first direction 74 (FIG. 7) and an opposite second direction 76 (FIGS. 3 and 7).

One end of a wheel flange 78 is secured to the wheel frame 58. The wheel flange 78 extends a distance outwardly from the wheel frame 58.

The third wheel assembly 34 comprises a third axle 80 (FIGS. 2 and 3) connected to the frame 12 near the rear end 24 of the frame 12. The third axle 80 extends a distance outwardly from the rear end 24 of the frame 12 and a third wheel 82 (FIGS. 1, 2 and 3) is rotatingly supported on the end of the third axle 80, opposite the end of the third axle 80 which is secured to the frame 12.

It should be noted that, although the first, the second and the third wheel assemblies 30, 32 and 34 each have been described herein and shown in the drawings as consisting of only one wheel each, each of the wheel assemblies 32 and 34 could include more than one wheel or only some of the wheel assemblies 30, 32 and 34 could include more than one wheel. It also should be noted that the first and the second wheel assemblies 30 and 32 are similarly constructed.

One end of a first steering rod 84 (FIGS. 2, 3, 5, 6, 7 and 8) is pivotally connected to the wheel flange 56 of the first wheel assembly 30. The opposite end of the first steering rod 84 is pivotally connected to a steering plate 86 (FIGS. 2, 3, 4, 5 and 6).

One end of a second steering rod 88 (FIGS. 2, 3, 4, 5, 6, 7 and 8) is pivotally connected to the wheel flange 78 of the second wheel assembly 30. The opposite end of the second steering rod 88 is pivotally connected to the steering plate 86.

The frame 12 includes a pair of guide bars 90 and 92 (FIGS. 1, 2, 3, 4, 5 and 6) extending along a lower side of the frame 12 and extending generally between the front end 22 and the second end 24 of the frame 12. The guide bars 90 and 92 extend in parallel planes. The guide bars 90 and 92 are spaced apart a distance 94 (FIG. 4) forming therebetween a guide path 96 (FIGS. 4 and 6) extending a distance between the front end 22 and the rear end 24 of the frame 12.

Figure 4:
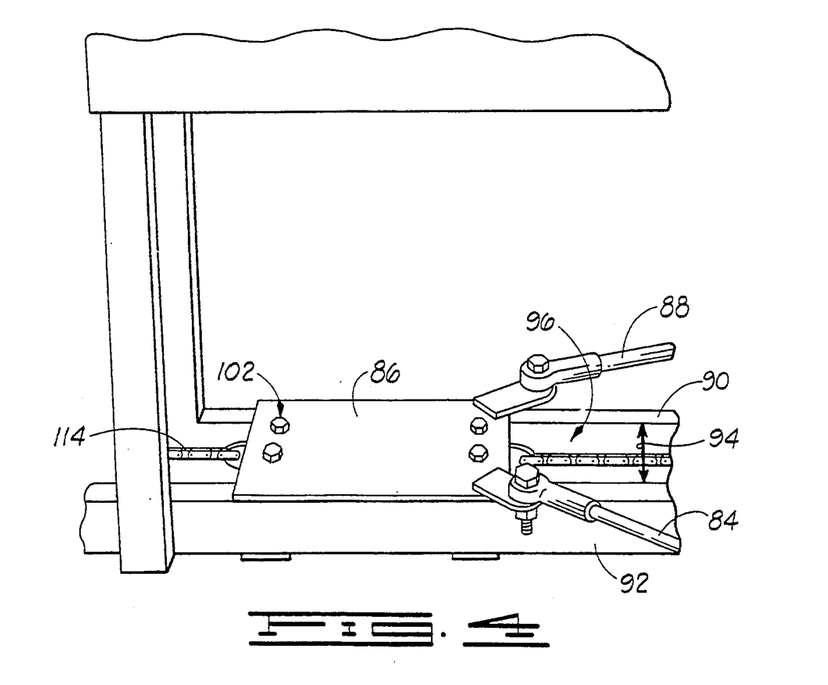
FIG. 4 is an enlarged view showing a portion of the frame and showing a steering plate portion of the steering assembly.

A steering bar 98 (shown in dashed lines in FIG. 9) is connected to the lower side of the steering plate 86. The steering bar 98 extends a distance from the steering plate 86. A retaining plate 100 is disposed over the steering bar 98. The retaining plate 100 and the steering bar 98 are secured to the steering plate 86 via a plurality of bolts 102 (FIGS. 4 and 9).

The steering bar 98 is disposed in the guide path 96 with the steering plate 86 resting on top of the guide bars 90 and 92.

The steering bar 98 has a width which is slightly less than the distance 94 between the guide bars 90 and 92 so that the steering bar 98 is slidingly disposed between the guide bars 90 and 92. The steering plate 86 is slidingly disposed on the top of the guide bars 90 and 92.

A first sprocket 104 (FIG. 9) is rotatingly supported on the guide bars 90 and 92 with the first sprocket 104 being disposed generally between the guide bars 90 and 92. A second sprocket 106 (FIG. 9) is rotatingly supported on the guide bars 90 and 92 with the second sprocket 106 being disposed between the guide bars 90 and 92. The first sprocket 104 is spaced a distance from the second sprocket 106. A third sprocket 108 (FIG. 9) is rotatingly disposed on the frame 12 and spaced a distance above the first sprocket 104. A reduction sprocket 110 (FIG. 9) is rotatingly supported on the frame 12 and spaced a distance above the second sprocket 106. A fourth sprocket 112 (FIG. 9) is disposed above the reduction sprocket 110 and rotatingly supported on a portion of the frame 12.

An endless first chain 114 (FIGS. 4 and 9) is extended about the sprockets 104, 106, 108, 110 and 112 as diagrammatically shown in FIG. 9. The first chain 114 extends from the third sprocket 108 about the smaller portion of the reduction sprocket 110 and then upwardly and about the fourth sprocket 112 and downwardly from the fourth sprocket 112 and about the second sprocket 106. The first chain 114 extends from the second sprocket 106 to the first sprocket 104. The first chain 114 is secured to the steering bar 98, as shown in FIG. 4).

A first steering wheel 116 (FIGS. 1, 2, 3 and 9) is rotatingly supported on a portion of the frame 12 near the front end 22. One end of a steering wheel shaft 118 (FIGS. 1, 2, 3 and 9) is connected to the first steering wheel 116 and the opposite end of the steering wheel shaft 118 is connected to a second steering wheel 120 (FIGS. 1, 2, 3 and 9). The steering wheel shaft 118 is rotatingly supported on the frame 12 near the front end 22. The first steering wheel 116 is disposed on the first side 26 of the frame 12 and the second steering wheel 120 is disposed on the second side 28 of the frame 12.

A steering wheel sprocket 122 (FIG. 9) is connected to the steering wheel shaft 118 about midway between the first and the second steering wheels 116 and 120. A second chain 124 (FIG. 9) extends about the steering wheel sprocket 122 and about the larger portion of the reduction sprocket 110.

When either the first or the second steering wheel 116 or 120 is rotated in a first direction 126, the steering wheel shaft 118 is rotated in the first direction 126 (FIG. 9) thereby rotating the steering wheel sprocket 122 in the first direction 126. The rotation of the first or the second steering wheel 116 or 120 in the first direction 126 rotates the larger portion of the reduction sprocket in a direction 128 (FIG. 9) due to the interconnection between the steering wheel sprocket 122 and the larger portion of the reduction sprocket 110 by the second chain 124. The rotation of the reduction sprocket 110 in the direction 128 causes the smaller portion of the reduction sprocket 110 to be rotated in the direction 128 thereby moving the first chain 114 in a direction 130 (FIGS. 3 and 9) and moving the steering plate 86 connected to the first chain 114 in the direction 130.

The movement of the steering plate 86 in the direction 130 causes the first wheel assembly 30 to be rotated in the first direction 52 (FIG. 7) as a result of the interconnection of the first steering rod 84 between the steering plate 86 and the wheel flange 56 of the first wheel assembly 30.

The movement of the steering plate 86 in the direction 130 causes the second wheel assembly 32 to be rotated in the second direction 76 as a result of the interconnection of the second steering rod 88 between the steering plate 86 and the wheel flange 78 of the second wheel assembly 32.

When either the first or the second steering wheel 116 or 122 is rotated in a second direction 136 (FIG. 9), the steering wheel shaft 118 is rotated in the second direction 136 thereby rotating the steering wheel sprocket 122 in the second direction 136. The rotation of the first or the second steering wheel 116 or 120 in the second direction 136 rotates the larger portion of the reduction sprocket in a direction 138 due to the interconnection between the steering wheel sprocket 122 and the larger portion of the reduction sprocket 110 by the second chain 124. The rotation of the reduction sprocket 110 in the direction 138 causes the smaller portion of the reduction sprocket 110 to be rotated in the direction 138 thereby moving the first chain 114 in a direction 140 (FIGS. 3 and 9) and moving the steering plate 86 connected to the first chain 114 in the direction 140.

The movement of the steering plate 86 in the direction 140 causes the first wheel assembly to be rotated in the second direction 54 as a result of the interconnection of the first steering rod 84 between the steering plate 86 and the wheel flange 56 at the first wheel assembly 30.

The movement of the steering plate 86 in the direction 140 causes the second wheel assembly 32 to be rotated in the second direction 76 as a result of the interconnection of the second steering rod 88 between the steering plate 86 and the wheel flange 78 of the second wheel assembly 32.

Figure 12:
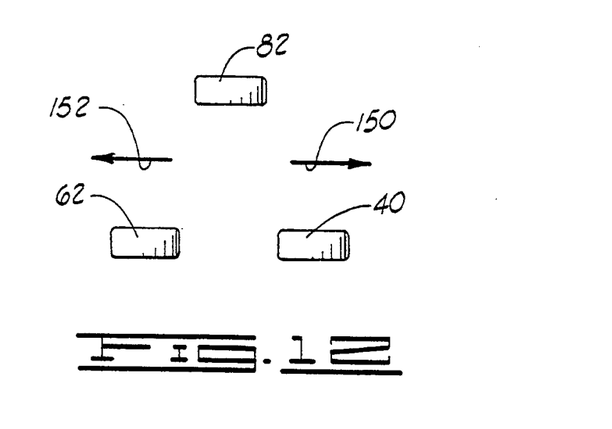
FIG. 12 is a diagrammatic view showing the first, the second and the third wheel assemblies steeringly positioned to move the machine in a forward or backward direction.

When the machine 10 is to be moved in a forward direction 150 (FIGS. 1 and 12) or a rearward direction 152 (FIGS. 1 and 12), the steering wheels 116 and 120 are rotated in either the first or the second direction 126 or 136 depending upon the starting position of the first and the second wheel assemblies 30 and 32 until the first and the second wheel assemblies 30 and 32 have been rotated to a position wherein the first and the second wheels 40 and 62 each extend in a plane about parallel with the planer disposition of the third wheel 82, as shown in FIGS. 1 and 12. In this position, the machine is rollingly moved in either the forward direction 150 or the rearward direction 152 on the first, the second and the third wheels 40, 62 and 82.

Figure 11:
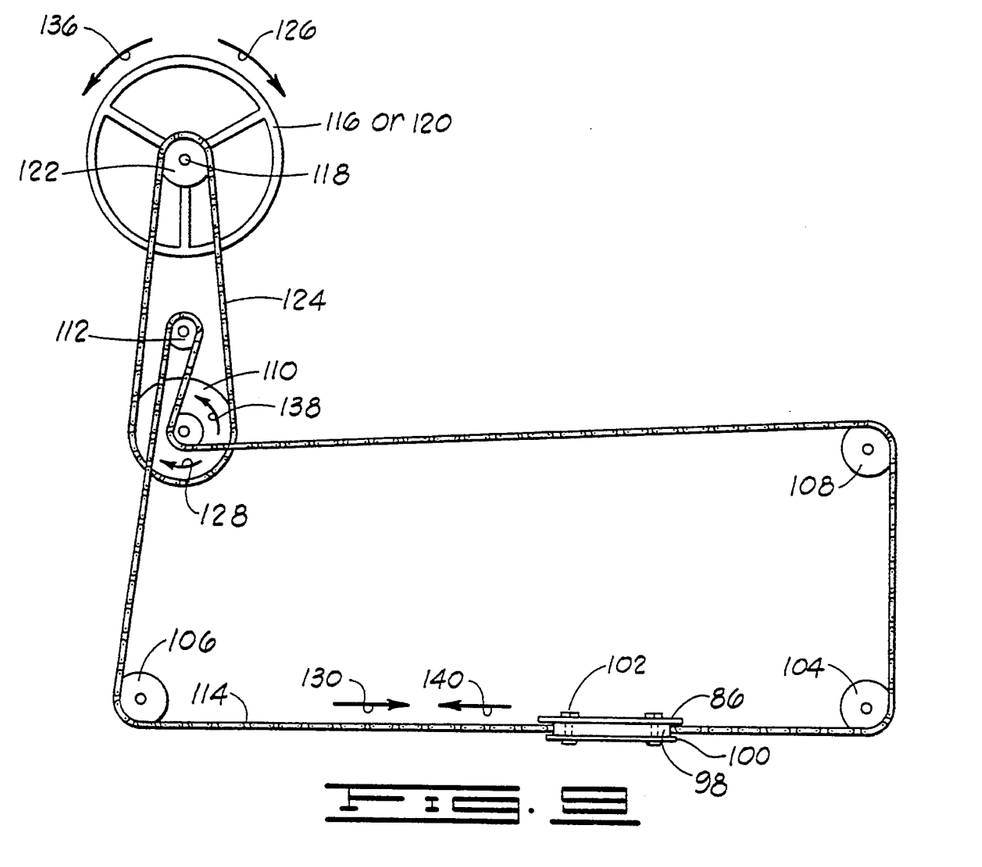
FIG. 11 is a schematic view showing the first, the second and the third wheel assemblies positioned to steeringly rotate the machine in a different first rotational direction or a second rotational direction.

Assuming the first and the second wheel assemblies 30 and 32 have been positioned in the position where the first and the second wheels 40 and 62 are aligned and extend in a plane parallel with the planer disposition of the third wheel 82 as shown in FIG. 12 and further assuming it is desired to turn the machine, the steering wheels 116 and 120 are rotated in the direction 126 thereby moving the steering plate 86 in the direction 130. The movement of the steering plate 86 in the direction 130 causes the first wheel 40 of the first wheel assembly 32 to be rotated in the first direction 52 and the second wheel 62 of the second wheel assembly 32 to be rotated in the opposite second direction 76 to the turning position illustrated in FIG. 11. In this position, the machine 10 can be turned in a direction 158 (FIG. 11) or an opposite direction 160 (FIG. 11) with the machine 10 turning generally about a pivot point 155 (FIG. 11) disposed a distance in front of the wheels 40 and 62. The pivot point 155 is disposed at about the center of an imaginary circle drawn through the wheels 40 and 62. In this position, the first wheel 40 extends in a plane at an angle 157 with respect to a center line axis 159 through the third wheel 82. Further, in this position, the second wheel 62 extends in a plane disposed at an angle 161 with respect to the center line axis 159 of the third wheel 82. The angles 157 and 161 each are greater than ninety degrees.

Figure 10:
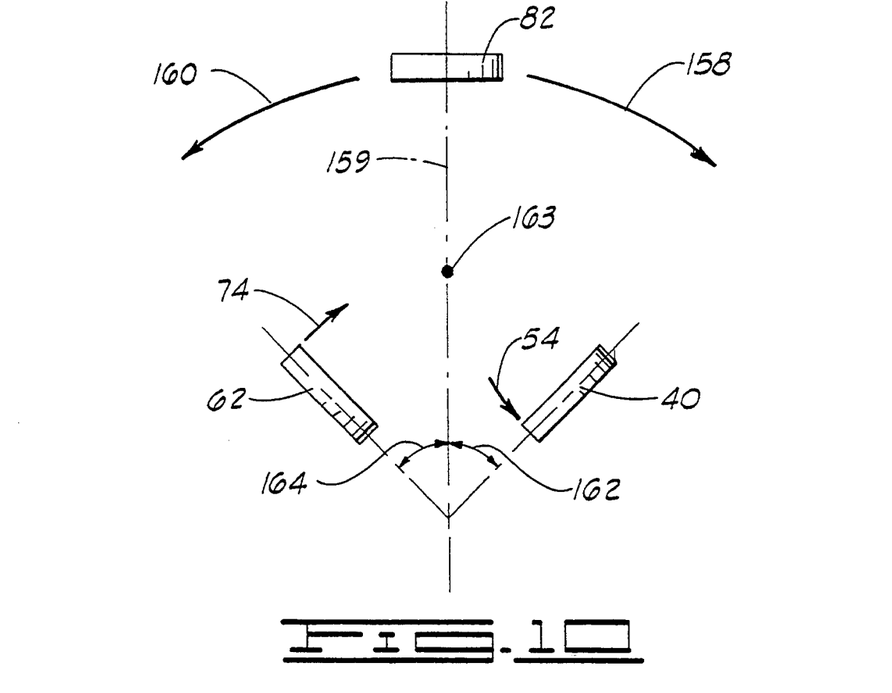
FIG. 10 is a diagrammatic view of the first, the second and the third wheel assemblies steeringly positioned for steeringly moving the machine in a first rotational direction or a second rotational rotation.

Assuming the first and the second wheel assemblies 30 and 32 have been moved to position the first and the second wheels 40 and 62 in the aligned position and further assuming it is desired to turn the machine 10, the steering wheels 116 and 120 are rotated in the direction 136 thereby causing the steering plate 86 to be moved in the direction 140. The movement of the steering plate in the direction 140 causes the first wheel assembly to be rotated in the second direction 54 and causes the second wheel assembly to be rotated in the first direction 74 thereby moving the first and the second wheels 40 and 62 to the position shown in FIG. 10. In this position where the first and the second wheel 40 and 42 are turned outwardly from the frame 12, the machine 10 can be turned in either the direction 158 (FIG. 10) or the direction 160 (FIG. 10) with the frame 10 being turned on a pivot point 163 located about midway between the first, the second and the third wheels 40, 62 and 82. In this position, the first wheel 40 extends in a plane disposed at an angle 162 with respect to the axial center line 159 of the third wheel 82. The second wheel 62 extends in a plane disposed at an angle 164 with respect to the axial center line 159 of the third wheel 82. The angles 162 and 164 each are less than ninety degrees.

The first and the second steering rods 84 and 88, the steering plate 86, the first chain 114 and the sprockets 104, 106, 108 and 110, the second chain 124 and the sprocket 122 cooperate with the first and the second steering wheels 116 and 120 and the steering wheel shaft connected thereto to form a steering assembly 127 for steeringly turning the first and the second wheel assemblies 30 and 32 in the directions 52, 54, 74 and 76. The steering assembly 127 is supported on the frame 12 and connected to the first and the second wheel assemblies 30 and 32 whereby the steering assembly 127 rotates the second wheel assembly 30 in the first direction 52 and simultaneously rotates the second wheel assembly 32 in the opposite second direction 76, and whereby the steering assembly simultaneously rotates the first wheel assembly 30 in the second direction 54 and simultaneously rotates the second wheel assembly 32 in the first direction 74 for steeringly turning the frame 12.

Changes may be made in the construction and the operation of the various components, elements and assemblies described herein and changes may be made in the steps or the sequence of steps of the methods described herein without departing from the spirit and scope of the invention as defined in the following claims.

What is claimed is:

1. An apparatus, comprising:

a frame having a front end, a rear end, a first side and a second side;

a working implement assembly connected to the frame;

a first wheel assembly pivotally connected to the frame proximate the front end and the first side of the frame so as to be rotatable about a first vertical axis in a first direction and in an opposite second direction;

a second wheel assembly pivotally connected to the frame proximate the front end and the second side of the frame so as to be rotatable about a second vertical axis in a first direction corresponding to the first direction of rotation of the first wheel assembly and an opposite second direction corresponding to the second direction of rotation of the first wheel assembly, the second wheel assembly alignable with the first wheel assembly;

a third wheel assembly connected to the frame proximate the rear end of the frame such that the first, second, and third wheel assemblies cooperate to support the frame; and steering means connected to the first and the second wheel assemblies for simultaneously rotating the first wheel assembly about the first vertical axis in the first direction and the second wheel assembly about the second vertical axis in the second direction and for simultaneously rotating the first wheel assembly about the first vertical axis in the second direction and the second wheel assembly about the second vertical axis in the first direction, the steering means comprising:

a first steering rod having a first end and a second end, the first end of the first steering rod being pivotally connected to the first wheel assembly;

a second steering rod having a first end and a second end, the first end of the second steering rod being pivotally connected to the second wheel assembly;

a steering plate mounted on the frame so that the steering plate is linearly movable in a first direction and an opposite second direction, the second end of the first steering rod and the second end of the second steering rod each being pivotally connected to the steering plate such that linear movement of the steering plate in the first direction causes the first wheel assembly to rotate about the first vertical axis in one of the first and second directions and the second wheel assembly to simultaneously rotate about the second vertical axis opposite the direction the first wheel assembly is rotated and such that linear movement of the steering plate in the second direction causes the first wheel assembly to rotate about the first vertical axis in the opposite direction which the first wheel assembly rotates when the steering plate is moved in the first direction and the second wheel assembly to simultaneously rotate about the second vertical axis opposite the direction of the first wheel assembly;

steering wheel means rotatably supported on the frame for rotation in a first direction and an opposite second direction; and non-fluidic link means connected to the steering wheel means and to the steering plate for non-fluidically transmitting rotational motion imparted on the steering wheel means to the steering plate whereby rotation of the steering wheel means in the first direction moves the steering plate in the first direction and rotation of the steering wheel means in the second direction moves the steering plate in the second direction.

2. The apparatus of claim 1 wherein the first wheel assembly further comprises:

a first axle;

first wheel means rotatingly supported on one end of the first axle; and wherein the second wheel assembly further comprises:

a second axle; and second wheel means rotatingly supported on the second axle.

3. The apparatus of claim 2 wherein the first wheel assembly further comprises:

a wheel frame, the first axle being connected to the wheel frame;

a spindle having one end connected to the wheel frame, the spindle extending a distance from the wheel frame;

a wheel arm having one end connected to the frame, the wheel arm extending a distance from the first side of the frame; and a bushing connected to the wheel arm, the spindle being rotatingly disposed in the bushing whereby the wheel frame and the first wheel means connected thereto are rotatable in the first direction about the spindle and in the opposite second direction about the spindle; and wherein the second wheel assembly further comprises:

a wheel frame, the second axle being connected to the wheel frame;

a spindle having one end connected to the wheel frame, the spindle extending a distance from the wheel frame;

a wheel arm having one end connected to the frame, the wheel arm extending a distance from the second side of the frame; and a bushing connected to the wheel arm, the spindle being rotatingly disposed in the bushing whereby the wheel frame and the second wheel means connected thereto are rotatable in the first direction about the spindle and in the opposite second direction about the spindle.

4. The apparatus of claim 1 wherein the non-fluidic link means comprises:

a first chain movably supported on the frame, the steering plate being connected to the first chain;

a second chain movably supported on the frame and connected to the steering wheel means; and sprocket means for connecting the second chain to the first chain whereby rotation of the steering wheel means in the first or second direction moves the second chain thereby causing the first chain to be moved in directions resulting in the steering plate connected to the first chain means to be moved in the first or the second direction.

5. An apparatus, comprising:

a frame having a front end, a rear end, a first side and a second side;

a working implement assembly connected to the frame;

a first wheel assembly pivotally connected to the frame proximate the front end and the first side of the frame so as to be rotatable about a first vertical axis in a first direction and in an opposite second direction;

a second wheel assembly pivotally connected to the frame proximate the front end and the second side of the frame so as to be rotatable about a second vertical axis in a first direction corresponding to the first direction of rotation of the first wheel assembly and an opposite second direction corresponding to the second direction of rotation of the first wheel assembly, the second wheel assembly alignable with the first wheel assembly;

a third wheel assembly connected to the frame proximate the rear end of the frame such that the first, second, and third wheel assemblies cooperate to support the frame; and steering means connected to the first and the second wheel assemblies for simultaneously rotating the first wheel assembly about the first vertical axis in the first direction and the second wheel assembly about the second vertical axis in the second direction and for simultaneously rotating the first wheel assembly about the first vertical axis in the second direction and the second wheel assembly about the second vertical axis in the first direction, the steering means comprising:

a first steering rod having a first end and a second end, the first end of the first steering rod being pivotally connected to the first wheel assembly;

a second steering rod having a first end and a second end, the first end of the second steering rod being pivotally connected to the second wheel assembly;

a steering plate slidingly mounted on the frame between the front end and the rear end thereof so that the steering plate is slidingly movable back and forth along a linear path between the front end and the rear end of the frame, the second end of the first steering rod and the second end of the second steering rod each being pivotally connected to the steering plate such that movement of the steering plate toward the front end of the frame causes the first wheel assembly to rotate about the first vertical axis in one of the first and second directions and the second wheel assembly to simultaneously rotate about the second vertical axis opposite the direction the first wheel assembly is rotated and such that movement of the steering plate toward the rear end of the frame causes the first wheel assembly to rotate about the first vertical axis in the opposite direction which the first wheel assembly rotates when the steering plate is moved toward the front end of the frame and the second wheel assembly to simultaneously rotate about the second vertical axis opposite the direction of the first wheel assembly; and means connected to the steering plate for selectively sliding the steering plate along the linear path between the front end and the rear end of the frame.

6. The apparatus of claim 5 wherein the means for sliding the steering plate comprises:

steering wheel means rotatably supported on the frame for rotation in a first direction and an opposite second direction; and link means connected to the steering wheel means and to the steering plate for transmitting rotational motion imparted on the steering wheel means to the steering plate whereby rotation of the steering wheel means in the first direction moves the steering plate toward the front end of the frame and rotation of the steering wheel means in the second direction moves the steering plate toward the rear end of the frame.

7. The apparatus of claim 6 wherein the link means comprises:

a first chain movably supported on the frame, the steering plate being connected to the first chain;

a second chain movably supported on the frame and connected to the steering wheel means; and sprocket means for connecting the second chain to the first chain whereby rotation of the steering wheel in the first or second direction moves the second chain thereby causing the first chain to move thereby causing the steering plate to move along a pair of parallel guide bars and effect simultaneous rotation on the first and second wheel assemblies.

8. The apparatus of claim 5 wherein the frame further comprises a pair of parallel guide bars extending between the front end and the rear end of the frame a distance apart so as to slidingly support the steering plate.

9. The apparatus of claim 8 wherein the steering plate has an upper side and a lower side, and wherein the apparatus further comprises:

a steering bar connected to the lower side of the steering plate, the steering bar slidingly disposed between the guide bars to guide the steering plate along the guide bars as the steering plate is moved to effect rotation of the first and second wheel assemblies about the first and second vertical axis, respectively.

10. The apparatus of claim 5 wherein the first wheel assembly further comprises:

a first axle;

first wheel means rotatingly supported on one end of the first axle; and wherein the second wheel assembly further comprises:

a second axle; and second wheel means rotatingly supported on the second axle.

11. The apparatus of claim 10 wherein the first wheel assembly further comprises:

a wheel frame, the first axle being connected to the wheel frame;

a spindle having one end connected to the wheel frame, the spindle extending a distance from the wheel frame;

a wheel arm having one end connected to the frame, the wheel arm extending a distance from the first side of the frame; and a bushing connected to the wheel arm, the spindle being rotatingly disposed in the bushing whereby the wheel frame and the first wheel means connected thereto are rotatable in the first direction about the spindle and in the opposite second direction about the spindle; and wherein the second wheel assembly further comprises:

a wheel frame, the second axle being connected to the wheel frame;

a spindle having one end connected to the wheel frame, the spindle extending a distance from the wheel frame;

a wheel arm having one end connected to the frame, the wheel arm extending a distance from the second side of the frame; and a bushing connected to the wheel arm, the spindle being rotatingly disposed in the bushing whereby the wheel frame and the second wheel means connected thereto are rotatable in the first direction about the spindle and in the opposite second direction about the spindle.

12. A drilling apparatus, comprising:

a frame having a front end, a rear end, a first side and a second side, the frame having a pair of parallel guide bars extending between the front end and the rear end so as to form a linear guide path;

a drilling implement supported by the frame;

a first wheel assembly pivotally connected to the frame proximate the front end and the first side of the frame so as to be rotatable about a first vertical axis in a first direction and in an opposite second direction, the first wheel assembly comprising:

a first wheel arm having one end connected to the frame and extending a distance from the first side of the frame;

a first bushing connected to the first wheel arm;

a first wheel frame;

a first spindle having one end connected to the first wheel frame and extending a distance from the first wheel frame, the first spindle rotatingly disposed in the first bushing whereby the first wheel frame is rotatable in the first direction about the first spindle and in the opposite second direction about the first spindle;

a first axle connected to the first wheel frame; and a first wheel rotatingly supported on the first axle;

a second wheel assembly pivotally connected to the frame proximate the front end and the second side of the frame so as to be rotatable about a second vertical axis in a first direction corresponding to the first direction of rotation of the first wheel assembly and an opposite second direction corresponding to the second direction of rotation of the first wheel assembly, the second wheel assembly alignable with the first wheel assembly and comprising:

a second wheel arm having one end connected to the frame and extending a distance from the second side of the frame;

a second bushing connected to the first wheel arm; a second wheel frame;

a second spindle having one end connected to the second wheel frame and extending a distance from the second wheel frame, the second spindle rotatingly disposed in the bushing such that the second wheel frame is rotatable in the first direction about the second spindle and in the opposite second direction about the second spindle;

a second axle connected to the second wheel frame; and a second wheel rotatingly supported on the second axle;

a third wheel assembly connected to the frame proximate the rear end of the frame such that the first, second, and third wheel assemblies cooperate to support the frame; and steering means connected to the first and the second wheel assemblies for simultaneously rotating the first wheel assembly about the first spindle in the first direction and the second wheel assembly about the second spindle in the second direction and for simultaneously rotating the first wheel assembly about the first spindle in the second direction and the second wheel assembly about the second spindle in the first direction, the steering means comprising:

a first steering rod having a first end and a second end, the first end of the first steering rod being pivotally connected to the first wheel frame of the first wheel assembly;

a second steering rod having a first end and a second end, the first end of the second steering rod being pivotally connected to the second wheel frame of the second wheel assembly;

a steering bar slidingly disposed between the guide bars of the frame;

a steering plate connected to the steering bar and slidingly supported on the guide bars such that the steering plate is slidingly movable back and forth along the linear guide path between the front end and the rear end of the frame, the second end of the first steering rod and the second end of the second steering rod each being pivotally connected to the steering plate such that movement of the steering plate toward the front end of the frame causes the first wheel assembly to rotate about the first vertical axis in one of the first and second directions and the second wheel assembly to simultaneously rotate about the second vertical axis opposite the direction the first wheel assembly is rotated and such that movement of the steering plate toward the rear end of the frame causes the first wheel assembly to rotate about the first vertical axis in the opposite direction which the first wheel assembly rotates when the steering plate is moved toward the front end of the frame and the second assembly to simultaneously rotate about the second vertical axis opposite the direction of the first wheel assembly; and means connected to the steering bar for selectively sliding the steering plate along the linear guide path between the front end and the rear end of the frame, the means comprising:

a steering wheel assembly rotatingly supported on the frame and rotatable in a first direction and an opposite second direction, the steering wheel assembly including a steering wheel shaft having a steering wheel connected at one end and a steering wheel sprocket connected to another end;

a first sprocket rotatingly supported on the guide bars near the rear end of the frame with the first sprocket disposed generally between the guide bars;

a second sprocket rotatingly supported on the guide bars near the front end of the frame with the second sprocket disposed generally between the guide bars;

a third sprocket rotatingly supported on the frame a distance above the first sprocket;

a reduction sprocket rotatingly supported on the frame a distance above the second sprocket, the reduction sprocket having a first sprocket portion and a second sprocket portion wherein the first sprocket portion is larger than the second sprocket portion;

a fourth sprocket rotatingly supported on the frame a distance above the reduction sprocket;

a first chain having a first end and a second end, each being connected to the steering bar, the first chain extended between the first sprocket, the third sprocket, the second portion of the reduction sprocket, the fourth sprocket and the second sprocket; and a second chain extended about the steering wheel sprocket and the first portion of the reduction sprocket, wherein rotation of the steering wheel in the first direction moves the steering plate along the linear guide path in one direction and rotation of the steering wheel in the second direction moves the steering plate along the linear guide path in the other direction.

* * * * *

UNITED STATES PATENT AND TRADEMARK OFFICE
CERTIFICATE OF CORRECTION

PATENT NO. : 5,385,213
DATED : January 31, 1995
INVENTOR(S) : Hake

It is certified that error appears in the above-identified patent and that said Letters Patent is hereby corrected as shown below:

Column 3, line 54, please delete "second wheel assembly 30" and substitute therefor -- second wheel assembly 32 --.

Column 3, line 60, please delete "second end 24" and substitute therefor -- rear end 24 --.

Column 5, line 17, please delete "122" and substitute therefor -- 120 --.

Column 5, lines 66-67, please delete "first wheel assembly 32" and substitute therefor -- first wheel assembly 30 --.

Column 6, line 28, please delete "second wheel 40 and 42" and substitute therefor -- second wheels 40 and 62 --.

Column 6, line 46, after "steering assembly" please delete "127".

Column 6, line 49, after "steering assembly" please delete "127".

Column 6, line 51, after "steering assembly" please delete "127".

UNITED STATES PATENT AND TRADEMARK OFFICE
CERTIFICATE OF CORRECTION

PATENT NO. : 5,385,213
DATED : January 31, 1995
INVENTOR(S) : Hake

It is certified that error appears in the above-indentified patent and that said Letters Patent is hereby corrected as shown below:

Column 6, line 52, please delete "second wheel assembly 30" and substitute therefor --first wheel assembly 30--.

Signed and Sealed this

Thirtieth Day of May, 1995

Attest:

BRUCE LEHMAN

Attesting Officer    Commissioner of Patents and Trademarks